Figure 1A:
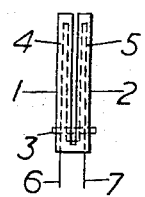

Nov. 15, 1966   E. H. FREI ETAL   3,285,470
THERMALLY ACTUATED DEVICES
Filed July 3, 1964   2 Sheets-Sheet 1

Inventors
EPHRAIM HEINRICH FREI
SAUL LEIBINZOHN
SHMUEL SHTRIKMAN
By OSTROLENK, FABER, GERB & SOFFEN
Attorneys

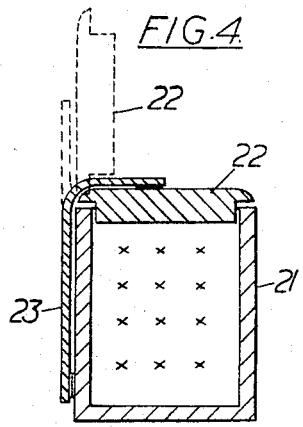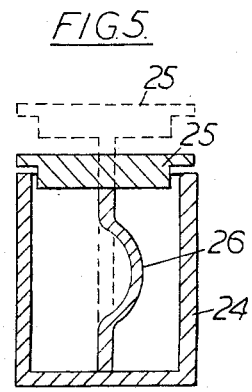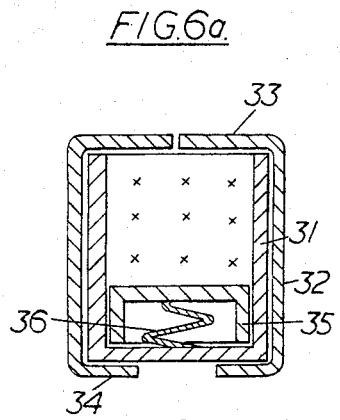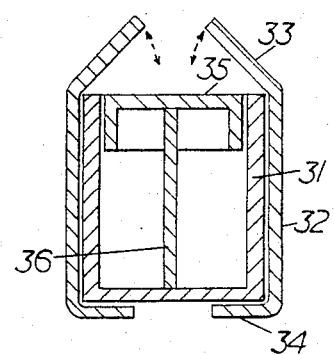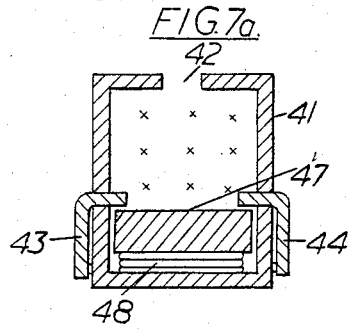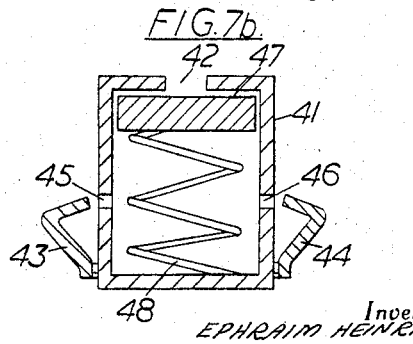

United States Patent Office 3,285,470
Patented Nov. 15, 1966

3,285,470
THERMALLY ACTUATED DEVICES
Ephraim Heinrich Frei, Rehovoth, Saul Leibinzohn, Rishon-Lezion, and Shmuel Shtrikman, Rehovoth, Israel; said Frei and Leibinzohn assignors to Yeda Research and Development Co., Ltd., Rehovoth, Israel, a company of Israel
Filed July 3, 1964, Ser. No. 380,150
Claims priority, application Great Britain, July 5, 1963, 26,841/63
14 Claims. (Cl. 222—54)

This invention relates to thermally actuated devices, i.e. devices which, upon being subjected to a variation of temperature, undergo a displacement into an operative state in which state the device can perform a mechanical action or can initiate such an action.

Known devices of this kind include elements such as, for example, bimetallic strips which, when heated, are distorted, the degree of distortion depending on the temperature to which the strip is raised. This fact that, with such strips and other elements of the same kind, the magnitude of the displacement or distortion is not unique but varies over a large range depending on the temperature, constitutes a limitation on the use of such known devices.

It is an object of the present invention to provide a novel, thermally actuated device in which the above-referred-to limitation is substantially overcome.

The invention is based on the utilization of materials which have become known as ferro-elastic materials. Such materials, of which characteristic examples are certain gold cadmium alloys, possess the characteristic property that, whilst below a certain temperature, known as the transition temperature, the material exists in a phase known as the $\beta'$ phase, above this temperature the material exists in another phase known as the $\beta$ phase. The mechanical properties of the material in the two phases differ in that, whilst the material in the $\beta$ phase exhibits substantial mechanical strength and resistance to distortion, in the $\beta'$ phase the material is mechanically rather weak, and can be readily shaped into any desired form.

These properties of ferro-elastic materials are utilized in accordance with the invention in the treatment of a ferro-elastic element for use in or as a thermally actuated device.

According to the present invention there is provided a method of treating a ferro-elastic element for use in or as a thermally actuated device comprising the steps of heating the element to above its transition point, pre-shaping the element into a desired operative shape, allowing the element to cool to below its transition point and forcing the element into a non-operative shape.

The element, which has been pre-shaped whilst in its $\beta$ phase and forced into a non-operative shape whilst in its $\beta'$ phase, reverts spontaneously to its pre-shaped operative shape when it is subjected to heating above its transition point. This return to its pre-shaped state takes place quite forcefully and the element is adapted to overcome substantial mechanical resistance in order to return to its pre-shaped operative state. This capability of the element to overcome such mechanical resistance renders it suitable for carrying out required mechanical actions.

Furthermore, return of the element to its pre-shaped state takes place suddenly as soon as the element passes through its transition point and further heating or cooling of the element does not result in any further displacement unlike known thermally actuated devices.

In the case of the gold cadmium alloys referred to above, the transition temperature which with the pure alloy is in the region of 60° C. can be reduced by the addition of very small amounts of additives, such as copper and/or silver.

Once the element has passed into the $\beta$ phase and has consequently reverted to its operative shape the subsequent cooling of the element to below its transition point and the passing of the element into its $\beta'$ phase will not automatically be accompanied by the return of the element into its non-operative shape. In order to ensure this return where this is required the element can be associated with a spring which tends to bias the element into its non-operative shape. When the element passes through its transition point into the $\beta$ phase the force of return of the element into its operative shape overcomes the biasing effect of the spring. When, however, the element passes through the transition point back to its $\beta'$ phase, the force of the spring is sufficient to force the mechanically weak element back into its non-operative shape.

Figure 1B:
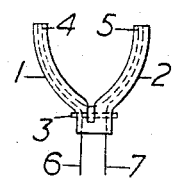
Figure 2A:
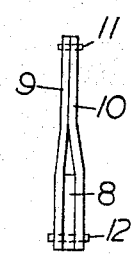
Figure 2B:
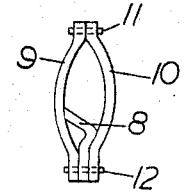
Figure 3A:
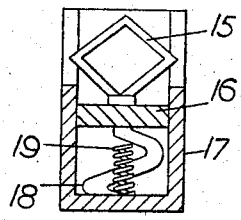
Figure 3B:
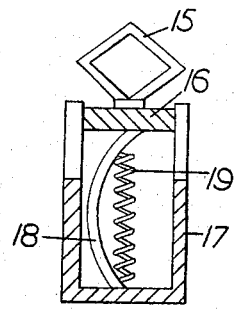

Various examples of the use of ferro-elastic elements prepared in accordance with the invention in or as thermally actuated devices will now be described by way of example and with reference to the accompanying drawings in which:

FIGS. 1a and 1b are schematic representations of a thermally actuated device with its ferro-elastic element respectively in $\beta'$ and $\beta$ phases, FIGS. 2a and 2b are schematic representations of a further form of thermally actuated device with its ferro-elastic element respectively in $\beta'$ and $\beta$ phases, FIGS. 3a and 3b are representations of a third form of thermally actuated device having ferro-elastic elements respectively in $\beta'$ and $\beta$ phases, FIGS. 4 and 5 are schematic representations of two further forms of thermally actuated devices designed to contain and release substances, FIGS. 6a and 6b are respective schematic representations of a substance-releasing thermally actuated device shown with its constituent ferro-elastic element respectively in $\beta'$ and $\beta$ positions, and FIGS. 7a and 7b show a further form of thermally actuated device for releasing substances with its constituent ferro-elastic element respectively in $\beta'$ and $\beta$ phases.

As seen in FIG. 1 of the drawings the device comprises a pair of rod-like ferro-elastic elements 1 and 2 which are secured to each other at one end thereof by a rivet 3 passing therethrough. Each element has, extending through the length thereof, electric heating wires 4 and 5 which are respectively connected to lead pairs 6 and 7.

FIG. 1b shows the device in its operative state, i.e. the state into which it passes after it has been heated through a transition point and into the $\beta$ phase. In order to ensure that the device adopts the shape shown in FIG. 1b it is necessary preliminarily to heat the device past its transition point so that it passes into the $\beta$ phase and, whilst in that phase, the two elements 1 and 2 are forcibly given the shape shown in FIG. 1b of the drawings. Now, when the device and its elements are cooled down beyond the transition temperature and pass into the $\beta'$ phase the elements become relatively soft and can easily be forced into the non-operative disposition shown in FIG. 1a of the drawings.

Thus, in use, the device shown in FIG. 1 can, for example, in its compact state as shown in FIG. 1a of the drawings be inserted into a closed system and manipulated by externally controlled means to a desired position. When the device is in the required disposition current can be passed through the heating wires causing the elements to pass into the $\beta$ phase whereupon they forcibly revert to the disposition shown in FIG. 1 of the drawings. The displacement of the elements can be employed to perform a mechanical action. Thus the elements can be provided with cutting edges which upon the displacement of the elements, can perform a cutting operation in a predetermined fashion. Alternatively, the elements can be used to widen a passage in which they are located.

As seen in FIG. 2 of the drawings, the thermally actuated device comprises a ferro-elastic element 8 which is located between the lower portion of a pair of steel strips 9 and 10. The strips are secured together at their upper ends by means of a rivet 11 and at their lower ends by means of a rivet 12 which also passes through the lower end of the ferro-elastic element 8.

Whilst in its β phase (i.e. when at a temperature above the transition point) the element 8 is forcibly given the shape shown in FIG. 2b of the drawings. When, however, the element is cooled to below its transition point and into the β′ phase the element is forced into a straight shape position shown in FIG. 2a of the drawings and is kept in position by the spring action of the strips 9 and 10. As can be seen, when in its β′ phase the element 8 is forced by the strips into a straight compact disposition but when the element is heated to beyond its transition point and into the β phase, the element reverts to its bent position and the force of return is sufficient to overcome the biasing effect of the springs and to spread them apart as shown in FIG. 2b of the drawings.

In use, the device as shown above can be inserted, for example, into the duct of a human body and can be manipulated by external control means to a desired position. When in this position, the device can be subjected to a heat pulse which can be imparted thereto, for example, inductively and the device opens out as shown in FIG. 2b of the drawings, this opening out can, for example, be used to widen an artery or the like. The main distinction in the operation of the device shown in FIG. 2 from that shown in FIG. 1 is that in the former device the cooling of the element to below its transition point and into the β′ phase is automatically accompanied by the forced return of the element to the disposition shown in FIG. 2a of the drawings under the influence of the biasing strips 9 and 10, whilst in the arrangement shown in FIG. 1, however, no such forced return is provided for.

In the example shown in FIG. 3, the device is used to actuate a cutting mechanism and for this purpose there is provided a knife 15 which is mounted on a base member 16 located in a cage 17. The base 16 is coupled to the base of the cage 17 by means of a ferro-elastic element 18 which, whilst in the β phase has been given the shape shown in FIG. 3b of the drawings. Whilst the device and its ferro-elastic element is maintained in the β′ phase (i.e. below its transition point) the element is maintained in the shape shown in FIG. 3a of the drawings by means of a tension spring 19 which biases the element into that shape position and results in the withdrawing of the base member 16 and its knife 15 into the cage. In use, the device is inserted into a closed system, for example, a duct of a human body and is manipulated into a required position. The device is then subjected to heating, for example microwave or induction heating, and as a result the element 18 passes into its β phase and elongates, in consequence, the knife 15 is ejected out of the cage and can perform a cutting action. As soon as the element has cooled down to below its transition point, the knife is withdrawn again into the cage by means of the spring 19 and the device as a whole can be withdrawn from the system.

FIG. 4 shows a substance containing and releasing device comprising a container 21 adapted to be filled with a substance, such as, for example, drugs, and a cover member 22 which is adapted to be held in position by means of a ferro-elastic element 23 one end of which is secured to the container 21 whilst the other end is secured to the cover member 22. In its β′ phase (i.e. below its transition point) the element 23 is bent as shown in full lines in the drawing so that the cover member is retained on the container 21 thereby sealing the receptacle. When, however, the element is subjected to a heat pulse which can be imparted, for example, inductively, the element reverts to its β phase in which position it straightens itself as shown in dotted lines in the drawing and as a result the cover member is raised into the position shown in dotted lines and the receptacle is open for release of the drugs.

FIG. 5 shows a further embodiment of a substance containing and releasing device comprising a container 24 and cover member 25 which is coupled to the base of the container by a ferro-elastic element 26 which, in its β′ phase is bowed so that the cover member 25 sits firmly on the container 24 closing it. When this device is subjected to heating and the element 26 passes into the β phase it reverts to its straight elongated shape, as shown in dotted lines in the drawings, and as a result the cover member 25 is displaced from off the container 24 and the latter is open for release of the drugs.

A further form of thermally actuated substance containing and releasing device is illustrated in FIGS. 6a and 6b of the darwings. This device comprises a receptacle 31 which is enclosed by a rubber sleeve 32 having flanged-over upper and lower ends 33 and 34. In the non-operative position shown in FIG. 6a of the drawings, the upper flanged ends 33 are disposed close to each other and a substance can be retained in the inner container 31. Located in the inner container 31 is a piston member 35 which is coupled to the base of a container 31 by means of a ferro-elastic element 36 which, in its operative β phase is elongated and straight and which in its β′ phase has been bent into an S shape as shown in FIG. 6a of the drawings.

In use, the device in its non-operative state, as shown in FIG. 6a of the drawings, is brought to the required location whereupon it is subjected to heating to above its transition point. As a result the ferro-elastic element 36 immediately returns to its straight and elongated position pushing the piston outwards thereby ejecting the contained substance through the separated upper flanges 33.

FIGS. 7a and 7b illustrate a further form of thermally actuated substance containing and releasing device in accordance with the invention. This device comprises a container 41 having an upper central outlet aperture 42. A pair of right-angled ferro-elastic elements 43 and 44 are secured (by welding or like means) each at one end thereof to the outer wall of the container 41 near the base thereof. The other limb of the elements 43 and 44 project, in the non-operative state of the device, through a pair of apertures 45 and 46 formed in the side walls of the container 41 into the interior of the container so as to constitute stop abutments for a piston 47 which is biased upwardly by means of a compression spring 48 located in the lower part of the container. The elements 43 and 44 have been pre-shaped so that in their β phase they have the shape and disposition shown in FIG. 7b of the drawings, i.e. with their respective limbs withdrawn from the interior of the container 41.

The non-operative state of the device is shown in FIG. 7a of the drawings wherein, when the device is maintained below the transition point of the elements 43 and 44, the internally projecting limbs of these elements retain the piston in its downward position. When, however, the device is subjected to heating sufficient to raise the elements above their transition point the latter are displaced into the position in FIG. 7b of the drawings whereupon the piston moves upwards under the influence of the spring 48 ejecting the substance in the container 41.

In all the examples shown above, the ferro-elastic elements have been formed of a gold cadmium alloy containing 47.5% atomic weight cadmium and up to 52% atomic weight of high purity gold. Now, such an alloy in its pure state has a transition point of about 60° C.

Where as indicated above the devices are intended for use in the human body the heating of the elements to beyond such a high transition point, whilst in the human body, is not practical. As indicated above, however, the addition of certain additives such as, for example copper and/or silver in very small proportions, results in the reduction of the transition point. It is desirable for medical uses that the transition point be in the region of 39–42° C. such a region being sufficiently above normal body temperature for the device not to be actuated under the influence of the body temperature but not being so high as to require the application of possibly dangerous heat pulses to the body. In order to achieve such a transition temperature, the addition of 0.5% copper is sufficient.

Preferably, the gold cadmium alloys employed should be monocrystalline. It has been found, however, that the necessary ferro-elastic phenomena are obtained with polycrystalline alloys which have been prepared in the following manner. The alloy in powder form is placed in a glass tube, the tube is then heated until the material melts and the tube itself softens and the tube is then pulled until it effectively constitutes a capillary filled with the material. The capillary is allowed to cool and the material is removed. In practice it is found that this material, although polycrystalline, exhibits the required ferro-elastic properties but is slightly harder in its $\beta'$ phase than the equivalent monocrystalline material.

It will be appreciated that whilst in the examples given above thermally actuated devices have been described particularly for medical applications for use in releasing drugs or in widening or cutting conduits through which they pass, the devices in accordance with the invention can equally well be employed for carrying out or for initiating other actions such as, for example, actuating switches or the like.

The thermally actuated devices in accordance with the invention are particularly suitable for design and use as micro-devices especially when subjected to remote control and actuation.

We claim:

1. A method for preparing a ferro-elastic element for use in or as a thermally actuated device, said element being constituted of a body of a ferro-elastic material consisting essentially of gold-cadmium alloy containing substantially equal proportions by weight of gold and cadmium and possessing a predetermined operative shape in its $\beta$ phase at temperatures above its transition temperature and a non-operative shape in its $\beta'$ phase at temperatures below its transition temperature, and said material returning to said operative shape whenever heated to its $\beta$ phase, which comprises heating said body above its transition temperature, pre-shaping the body into said operative shape, permitting the pre-shaped material to cool below its transition temperature, and placing the cooled body in said non-operative shape.

2. The method for preparing a ferro-elastic element, as defined in claim 1, in which said gold-cadmium alloy contains a very small proportion of a silver and/or copper additive to decrease the transition temperature thereof.

3. The method for preparing a ferro-elastic element, as defined in claim 1, wherein said gold-cadmium alloys is monocrystalline.

4. The method for preparing a ferro-elastic element, as defined in claim 1, wherein said gold-cadmium alloy is a polycrystalline material prepared by placing the gold-cadmium alloy in a glass tube, heating the tube until said alloy melts and the tube softens, drawing the tube to form a capillary filled with said alloy, permitting the alloy to cool, and removing the cooled, polycrystalline alloy material from the tube.

5. A thermally actuated device including:
at least one ferro-elastic element constituted of a body of a ferro-elastic material consisting essentially of a gold-cadmium alloy containing substantially equal proportions by weight of gold and cadmium and possessing a predetermined operative shape in its $\beta$ phase at temperatures above its transition temperature and a non-operative shape in its $\beta'$ phase at temperatures below its transition temperature, said material returning to said operative shape whenever heated to its $\beta$ phase, which element has been formed by
heating said body above its transition temperature, pre-shaping the body into said operative shape, permitting the pre-shaped material to cool below its transition temperature, and placing the cooled body in said non-operative shape; and
spring means tending to bias said element into its non-operative shape, the elastic force produced by said spring means being insufficient to bias said element into its non-operative shape when the ferro-elastic material thereof is in its $\beta$ phase but being sufficient to bias said element into its non-operative shape when the ferro-elastic material is in its $\beta'$ phase.

6. A thermally actuated device including:
at least one ferro-elastic element constituted of a body of a ferro-elastic material consisting essentially of a gold-cadmium alloy containing substantially equal proportions by weight of gold and cadmium and possessing a predetermined operative shape in its $\beta$ phase at temperatures above its transition temperature and a non-operative shape in its $\beta'$ phase at temperatures below its transition temperature, said material returning to said operative shape whenever heated to its $\beta$ phase, which element has been formed by
heating said body above its transition temperature, pre-shaping the body into said operative shape, permitting the pre-shaped material to cool below its transition temperature, and placing the cooled body in said non-operative shape.

7. The thermally actuated device of claim 6, wherein said spring means comprises a pair of steel strips secured together at their ends, and in which said ferro-elastic element is sandwiched between said strips, said element pushing said strips apart, when in its operative shape.

8. A thermally actuated device according to claim 6 and an actuating member coupled to said element, the ferro-elastic element displacing said actuating member when the former is passed from its non-operative to its operative shape.

9. The thermally actuated device of claim 8, including means for heating said ferro-elastic element.

10. The thermally actuated device of claim 8, which comprises at least two ferro-elastic elements which in their non-operative shapes are forced together and in their operative shapes are splayed apart.

11. The thermally actuated device of claim 8, wherein said actuating member is a plunger located in a receptacle, said plunger being held within the receptacle by the ferro-elastic element, when the latter is in its non-operative shape, and being projected towards an outlet of the receptacle, when the ferro-elastic element is transformed into its operative shape.

12. The thermally actuated device of claim 11, wherein said plunger is spring-biased towards the outlet of the receptacles, and wherein the ferro-elastic element, when in its non-operative shape, abuts and engages said plunger to restrain it from moving towards the outlet under the influence of the spring-biasing and, when in its operative shape, is disengaged from said plunger to permit movement of the plunger under the influence of the spring-biasing.

13. The thermally actuated device of claim 11, including a container and a cover therefor, said ferro-elastic element being secured at its opposite ends to the container and cover, respectively, and maintaining the cover in its closed position, when in its non-operative shape, and lifting said cover to open the container, when in its operative shape.

14. A thermally actuated device including:
at least one ferro-elastic element constituted of a body of a ferro-elastic material consisting essentially of a gold-cadmium alloy containing substantially equal proportions by weight of gold and cadmium and possessing a predetermined operative shape in its $\beta$ phase at temperatures above its transition temperature and a non-operative shape in its $\beta'$ phase at temperatures below its transition temperature, said material returning to said operative shape whenever heated to its $\beta$ phase, which element has been formed by
  heating said body above its transition temperature, pre-shaping the body into said operative shape, permitting the pre-shaped material to cool below its transition temperature, and placing the cooled body in said non-operative shape; and
spring means tending to bias said element into its non-operative shape, the elastic force produced by said spring means being insufficient to bias said element into its non-operative shape when the ferro-elastic material thereof is in its $\beta$ phase but being sufficient to bias said element into its non-operative shape when the ferro-elastic material is in its $\beta'$ phase.

References Cited by the Examiner
UNITED STATES PATENTS

| | | | |
|---|---|---|---|
| 528,559 | 11/1894 | Peabody | 83—586 |
| 1,706,152 | 3/1929 | Gergler et al. | 83—586 |
| 1,905,247 | 4/1933 | Scott | 75—126 X |
| 2,209,674 | 7/1940 | Burish | 148—130 |
| 2,428,825 | 10/1947 | Arnoldy | 148—130 |
| 2,883,921 | 4/1959 | Morrison | 222—54 |
| 2,997,206 | 8/1961 | Vandegaer et al. | 222—54 |
| 3,160,319 | 12/1964 | Patzelt et al. | 222—54 |

ROBERT B. REEVES, *Primary Examiner.*

HADD S. LANE, RAPHAEL M. LUPO, *Examiners.*